(12) United States Patent
Lee et al.

(10) Patent No.: US 11,204,514 B2
(45) Date of Patent: Dec. 21, 2021

(54) QUANTUM DOT LIGHT MODULATOR AND APPARATUS INCLUDING THE SAME

(71) Applicants: SAMSUNG ELECTRONICS CO., LTD., Suwon-si (KR); CALIFORNIA INSTITUTE OF TECHNOLOGY, Pasadena, CA (US)

(72) Inventors: Duhyun Lee, Yongin-si (KR); Ruzan Sokhoyan, Pasadena, CA (US); Yu-Jung Lu, Pasadena, CA (US); Ghazaleh Kafaie Shirmanesh, Pasadena, CA (US); Harry Atwater, Pasadena, CA (US); Ragip Pala, Pasadena, CA (US); Chanwook Baik, Yongin-si (KR)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 500 days.

(21) Appl. No.: 16/156,628

(22) Filed: Oct. 10, 2018

(65) Prior Publication Data

US 2019/0107740 A1 Apr. 11, 2019

Related U.S. Application Data

(60) Provisional application No. 62/570,264, filed on Oct. 10, 2017.

(30) Foreign Application Priority Data

May 15, 2018 (KR) .................. 10-2018-0055659

(51) Int. Cl.
*G02F 1/03* (2006.01)
*G02F 1/017* (2006.01)
(Continued)

(52) U.S. Cl.
CPC ............ *G02F 1/0311* (2013.01); *G02F 1/017* (2013.01); *G02F 1/133617* (2013.01); *G02F 1/0151* (2021.01); *G02F 2202/36* (2013.01)

(58) Field of Classification Search
CPC .. G02F 1/0311; G02F 1/017; G02F 1/133617; G02F 1/0151; G02F 2202/36; G02F 1/03; G02F 1/1335; G02F 1/015
See application file for complete search history.

(56) References Cited

U.S. PATENT DOCUMENTS 10,203,527 B2 2/2019 Xu et al.
2002/0028045 A1* 3/2002 Yoshimura ............. G02B 6/132
385/50

(Continued)

FOREIGN PATENT DOCUMENTS

EP 3 088 949 A1 11/2016
KR 10-2018-0039338 A 4/2018
(Continued)

OTHER PUBLICATIONS

Communication dated Feb. 12, 2019 issued by the European Patent Office in counterpart European Patent Application No. 18195547.7.
(Continued)

*Primary Examiner* — Balram T Parbadia
(74) *Attorney, Agent, or Firm* — Sughrue Mion, PLLC

(57) ABSTRACT

Provided is a quantum dot (QD) light modulator and an apparatus including the QD light modulator. The QD light modulator may include a QD-containing layer including QDs having light-emission characteristics, a refractive index change layer arranged adjacent to the QD-containing layer, and a reflector arranged facing the QD-containing layer. The refractive index change layer may include a carrier density change area in which a carrier density changes, and the carrier density change area may be arranged adjacent to the QD-containing layer. The light-emission characteristics of
(Continued)

the QD-containing layer may be modulated according to a change in a property of the refractive index change layer. The QD light modulator may further include a nano-antenna structure arranged on the QD-containing layer.

22 Claims, 13 Drawing Sheets

(51) Int. Cl.
*G02F 1/13357* (2006.01)
*G02F 1/015* (2006.01)

(56) References Cited

U.S. PATENT DOCUMENTS

| | | | | |
|---|---|---|---|---|
| 2002/0039464 | A1* | 4/2002 | Yoshimura | G02B 6/13 385/14 |
| 2002/0097962 | A1* | 7/2002 | Yoshimura | H01L 23/48 385/50 |
| 2002/0176474 | A1* | 11/2002 | Huang | B82Y 10/00 372/96 |
| 2003/0063647 | A1* | 4/2003 | Yoshida | H01S 5/06256 372/50.1 |
| 2005/0259699 | A1* | 11/2005 | Zakhleniuk | H01S 5/06256 372/20 |
| 2006/0065902 | A1* | 3/2006 | Todori | G02F 1/01716 257/79 |
| 2011/0261303 | A1* | 10/2011 | Jang | G02F 1/1334 349/108 |
| 2012/0326116 | A1 | 12/2012 | Ellis et al. | |
| 2015/0070628 | A1 | 3/2015 | Suzuki et al. | |
| 2015/0243849 | A1 | 8/2015 | Stroetmann | |
| 2015/0331297 | A1* | 11/2015 | Han | G02B 5/30 359/9 |
| 2016/0064612 | A1 | 3/2016 | Ren et al. | |
| 2016/0070047 | A1* | 3/2016 | Okuyama | G02F 1/133617 349/71 |
| 2016/0161644 | A1 | 6/2016 | Verschuuren et al. | |
| 2016/0320665 | A1* | 11/2016 | Cho | G02F 1/133504 |
| 2017/0031183 | A1 | 2/2017 | Han et al. | |
| 2017/0084761 | A1 | 3/2017 | Cho et al. | |
| 2018/0102339 | A1 | 4/2018 | Hwang | |
| 2018/0103321 | A1 | 4/2018 | Seo et al. | |
| 2018/0246377 | A1* | 8/2018 | Fan | G02F 1/133603 |

FOREIGN PATENT DOCUMENTS

| | | |
|---|---|---|
| KR | 10-2018-0039339 A | 4/2018 |
| WO | 2017/161714 A1 | 9/2017 |

OTHER PUBLICATIONS

Askelrod, et al., "Probing the mechanisms of large Purcell enhancement in plasmonic nanoantennas", Nature Photonics, Nov. 2014, vol. 8, pp. 835-840.

Sun et al., "High-efficiency Broadband Anomalous Reflection by Gradient Meta-surfaces", Nano Letters 2012, pp. 1-12.

Hoang, et al., "Ultrafast spontaneous emission source using plasmonic nanoantennas" Jul. 2015, Nature Communications, vol. 6, pp. 1-7.

* cited by examiner

QUANTUM DOT LIGHT MODULATOR AND APPARATUS INCLUDING THE SAME

CROSS-REFERENCE TO RELATED APPLICATIONS

This application claims the benefit of Provisional U.S. Patent Application No. 62/570,264, filed on Oct. 10, 2017, in the U.S. Patent Office, and claims priority from Korean Patent Application No. 10-2018-0055659, filed on May 15, 2018, in the Korean Intellectual Property Office, the disclosures of which are incorporated herein in their entirety by reference.

BACKGROUND

1. Field

Apparatuses consistent with example embodiments relate to light modulators and apparatuses including the same.

2. Description of the Related Art

Optical devices for changing the characteristics of light, such as transmission/reflection, phase, amplitude, polarization, intensity, path, etc., are used in a variety of optical apparatuses. Optical modulators having various structures have been suggested to control the above characteristics in a desired method in an optical system. For example, liquid crystal having optical anisotropy or a microelectromechanical system (MEMS) structure using a fine mechanical movement of a light blocking/reflection element may be used for general optical modulators. Such optical modulators have a slow operation response time of over several microseconds ($\mu s$) due to the characteristics of a driving method.

SUMMARY

One or more example embodiments may provide quantum dot (QD) light modulators which may modulate optical properties at high speed by using QDs.

One or more example embodiments may provide QD light modulators which may improve input and output characteristics of light (input/output coupling characteristics).

One or more example embodiments may provide apparatuses including the QD light modulators.

Additional example aspects and advantages will be set forth in part in the description which follows and, in part, will be apparent from the description, or may be learned by practice of the presented example embodiments.

According to an aspect of an example embodiment, a QD light modulator includes a QD-containing layer including QDs having light-emission characteristics, a refractive index change layer arranged adjacent to the QD-containing layer, and a reflector arranged facing the QD-containing layer, in which the QD light modulator is configured to modulate light-emission characteristics of the QD-containing layer based on a change in properties of the refractive index change layer.

The refractive index change layer may include a carrier density change area in which a carrier density changes, and the carrier density change area may be arranged adjacent to the QD-containing layer.

The refractive index change layer may be arranged between the QD-containing layer and the reflector.

The refractive index change layer may include at least one of a transparent conductive oxide and a transition metal nitride.

The QDs may be excited by a wavelength of light $\lambda$, and the refractive index change layer may have a thickness corresponding to an integer multiple of $\lambda/4$.

The QD light modulator may further include a signal application device that applies an electrical signal to the refractive index change layer, wherein a refractive index of the refractive index change layer is changeable according to the signal applied from the signal application device.

The QD-containing layer may include a plurality of QDs embedded in an insulating layer.

The reflector may include a metal layer.

The QD light modulator may further include a nano-antenna structure that is arranged on the QD-containing layer, and the QD-containing layer and the refractive index change layer may be arranged between the reflector and the nano-antenna structure.

The QD-containing layer may be arranged between the refractive index change layer and the nano-antenna structure.

The nano-antenna structure may directly contact one surface of the QD-containing layer.

The nano-antenna structure may include an output coupler that is configured to control output characteristics of light emitted from the QD-containing layer.

A resonance wavelength region of the output coupler may at least partially overlap with an emission wavelength region of the QD-containing layer.

The nano-antenna structure may further include an input coupler that is spaced apart from the output coupler.

A resonance wavelength region of the input coupler may at least partially overlap with an excitation wavelength region of the QDs.

The nano-antenna structure may include a multi-patch antenna structure or a fishbone antenna structure.

The nano-antenna structure may include any one of a metallic antenna, a dielectric antenna, and a slit-containing structure.

The QD-containing layer and the refractive index change layer may constitute a stack structure. The QD light modulator may further include a band-stop mirror provided on the stack structure.

The QD light modulator may further include, between the stack structure and the reflector, a light source element that optically excites the QDs of the QD-containing layer or an optical waveguide that guides light to optically excite the QDs of the QD-containing layer.

The refractive index change layer may include a plurality of refractive index change layers and the QD-containing layer includes a plurality of QD-containing layers, and the plurality of refractive index change layers and the plurality of QD-containing layers may be stacked alternatingly.

At least two of the plurality of QD-containing layers may have different central emission wavelengths.

The plurality of QD-containing layers may include a first QD-containing layer and a second QD-containing layer, the first QD-containing layer including a first plurality of QDs and the second QD-containing layer including a second plurality of QDs, and the first plurality of QDs and the second plurality of QDs may include different materials and/or have different sizes.

At least two of the plurality of refractive index change layers may include different materials or have different carrier densities.

The QD light modulator may further include a first dielectric layer arranged between the reflector and the refractive index change layer, and a second dielectric layer arranged between the refractive index change layer and the QD-containing layer.

According to an aspect of another example embodiment, an optical apparatus include the quantum dot (QD) light modulator that includes a QD-containing layer including a plurality of QDs having light-emission characteristics, a refractive index change layer arranged adjacent to the QD-containing layer, and a reflector arranged facing the QD-containing layer, in which the QD light modulator is configured to modulate light-emission characteristics of the QD-containing layer based on a change in properties of the refractive index change layer.

BRIEF DESCRIPTION OF THE DRAWINGS

These and/or other example aspects and advantages will become apparent and more readily appreciated from the following description of example embodiments, taken in conjunction with the accompanying drawings in which.

DETAILED DESCRIPTION

Figure 1:
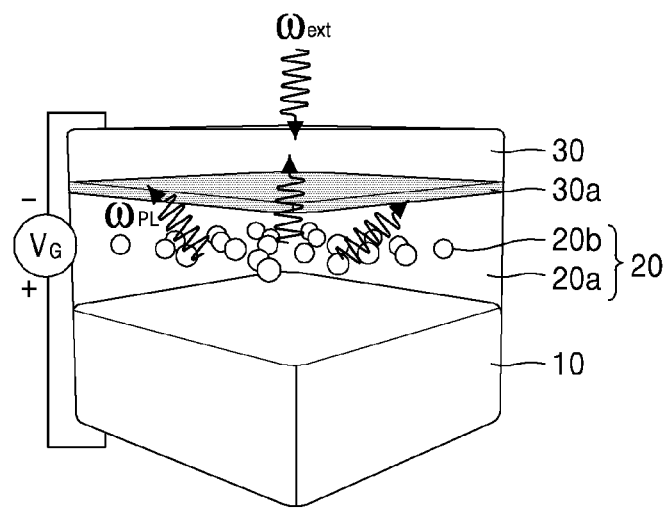
FIG. 1 is a perspective view of a quantum dot (QD) light modulator according to an example embodiment and for explaining the principle of optical modulation which is applicable thereto.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Reference will now be made in detail to example embodiments which are illustrated in the accompanying drawings, wherein like reference numerals refer to like elements throughout. Also, the size of each layer illustrated in the drawings may be exaggerated for convenience of explanation and clarity. In this regard, the present embodiments may have different forms and should not be construed as being limited to the descriptions set forth herein.

FIG. 1 is a perspective view of a quantum dot (QD) light modulator according to an example embodiment and for explaining the principle of optical modulation which is applicable thereto.

Referring to FIG. 1, a QD-containing layer 20 containing a plurality of QDs 20b having light-emission characteristics may be provided. The QD-containing layer 20 may include an insulating layer 20a and the QDs 20b embedded in the insulating layer 20a. A refractive index change layer 30 may be provided adjacent to the QD-containing layer 20. A refractive index of the refractive index change layer 30 may be variable according to an electrical signal applied thereto or other conditional change. A permittivity of the refractive index change layer 30 may be variable according to an electrical condition. A charge concentration (charge density) of an area in the refractive index change layer 30 may be variable according to an electric field applied to the refractive index change layer 30. Accordingly, the permittivity of the refractive index change layer 30 may be changed. A conductive layer 10 may be further provided to face (oppose) the QD-containing layer 20. The conductive layer 10 may include metal, and may serve as a reflector or a partial reflective layer. Furthermore, the conductive layer 10 may serve as an electrode. The QD-containing layer 20 may be arranged between the conductive layer 10 and the refractive index change layer 30. For example, the conductive layer 10 may include Ag, and the refractive index change layer 30 may include TiN. The insulating layer 20a may include $SiO_2$, and the QDs 20b may include InP. However, these material configurations are merely exemplary and may vary as occasion demands.

A signal application device $V_G$ may be connected between the conductive layer 10 and the refractive index change layer 30 to apply an electrical signal therebetween. A carrier density in a partial area (region) of the refractive index change layer 30 may be changed according to the electric signal (voltage) applied by the signal application device $V_G$ between the conductive layer 10 and the refractive index change layer 30. This area may be referred to as a carrier density change area 30a. The carrier density change area 30a may be located adjacent to the QD-containing layer 20. The carrier density change area 30a may be located on a boundary surface between the refractive index change layer 30 and the QD-containing layer 20. A local density of states (LDOS) may be changed at a position where there are the QDs 20b according to a change in the carrier density. Light $\omega_{PL}$ is generated from the QDs 20b that are excited by external light $\omega_{ext}$ due to a photoluminescence (PL) effect. The light-emission characteristics of QDs may be controlled (tuned) by LDOS modulation. "$V_G$" indicating the signal application device VG may also denote a voltage applied by the signal application device VG to the QD light modulator.

Figure 2:
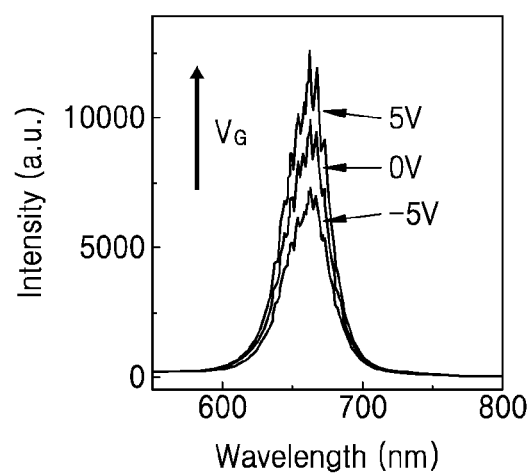
FIG. 2 is a graph showing a change in the intensity of photoluminescence (PL) according to a change in a voltage applied to the QD light modulator of FIG. 1.

FIG. 2 is a graph showing a change in the intensity of PL according to a change in the voltage VG applied to the QD light modulator of FIG. 1. It may be seen from the graph that the intensity of PL changes according to the change in the voltage VG applied to the QD light modulator.

Figure 3:
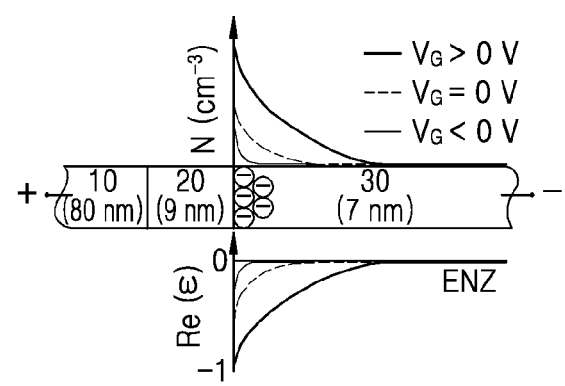
FIG. 3 is a graph showing a change in the properties of a refractive index change layer according to a change in the voltage applied to the QD light modulator of FIG. 1.

FIG. 3 is a graph showing a change in the properties of the refractive index change layer 30 according to a change in the voltage VG applied to the QD light modulator of FIG. 1.

Referring to FIG. 3, carrier concentration N and permittivity Re change of the refractive index change layer 30 according to the change in the voltage $V_G$ may be seen. In particular, the properties (physical properties) of a portion of the refractive index change layer 30 adjacent to the QD-containing layer 20 may be greatly changed. In the graph, "ENZ" denotes an epsilon near zero point.

Figure 4:
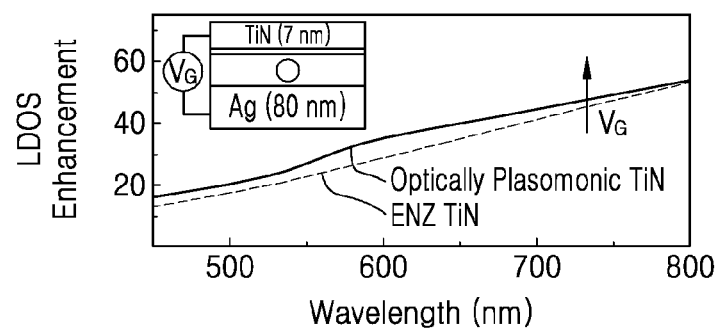
FIG. 4 is a graph showing how a local density of states (LDOS) enhancement spectrum at the position of quantum dot changes according to a change in the voltage.

FIG. 4 is a graph showing how an LDOS enhancement spectrum at the position of QD changes according to a change in the voltage $V_G$. In the graph, the dashed line indicates a case in which $V_G$ is less than 0 V, that is, a refractive index change layer (TiN) is in an ENZ area. The solid line indicates a case in which $V_G$ is greater than 0 V, that is, the refractive index change layer (TiN) includes an optically plasmonic TiN area. It may be seen from the graph that LDOS enhancement effect occurs according to the change in the voltage $V_G$.

Figure 5:
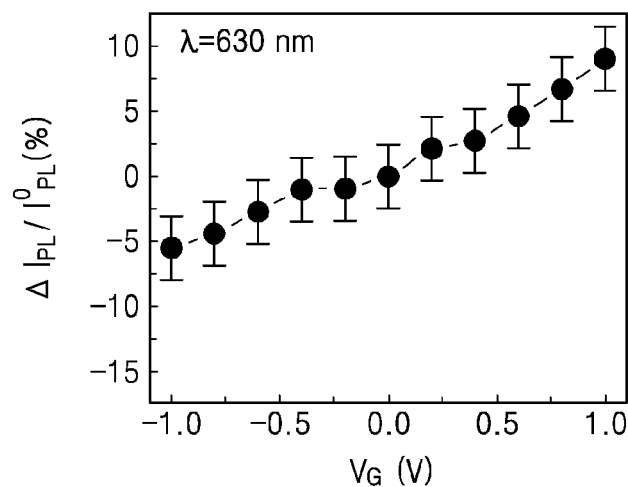
FIG. 5 is a graph showing a result of the measurement of the amount of changes in the intensity of PL of quantum dots according to a change in the voltage.

FIG. 5 is a graph showing a result of the measurement of the amount of changes in the intensity of PL of QDs according to a change in the voltage $V_G$. The graph of FIG. 5 is based on the device of FIG. 1. In the graph, $I^0_{PL}$ denotes the PL intensity at 0 V, and $\Delta I_{PL}$ denotes a difference between the PL intensity at a certain voltage that is not 0 V and the PL intensity at 0 V. it may be seen from the result of FIG. 5 that the amount of a change of the PL intensity (that is, $\Delta I_{PL}/I^0_{PL}$) (%) varies according to the change in the voltage VG.

Figure 6:
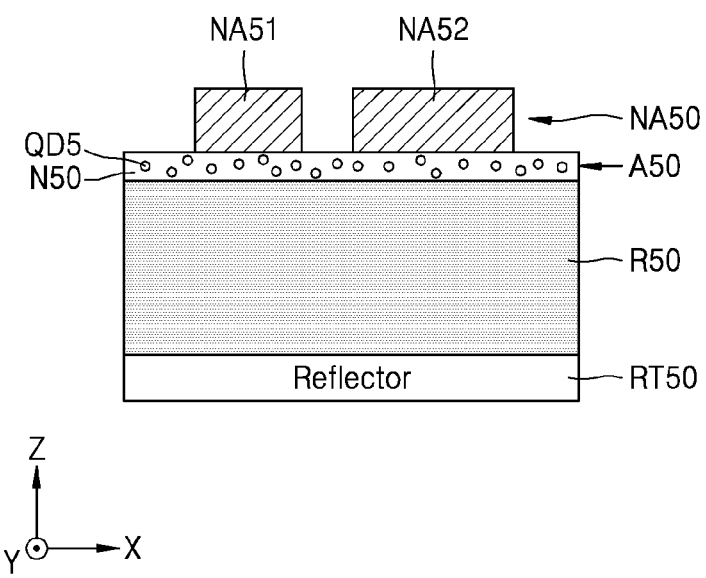
FIG. 6 is a cross-sectional view of a QD light modulator according to another example embodiment.
Figure 7:
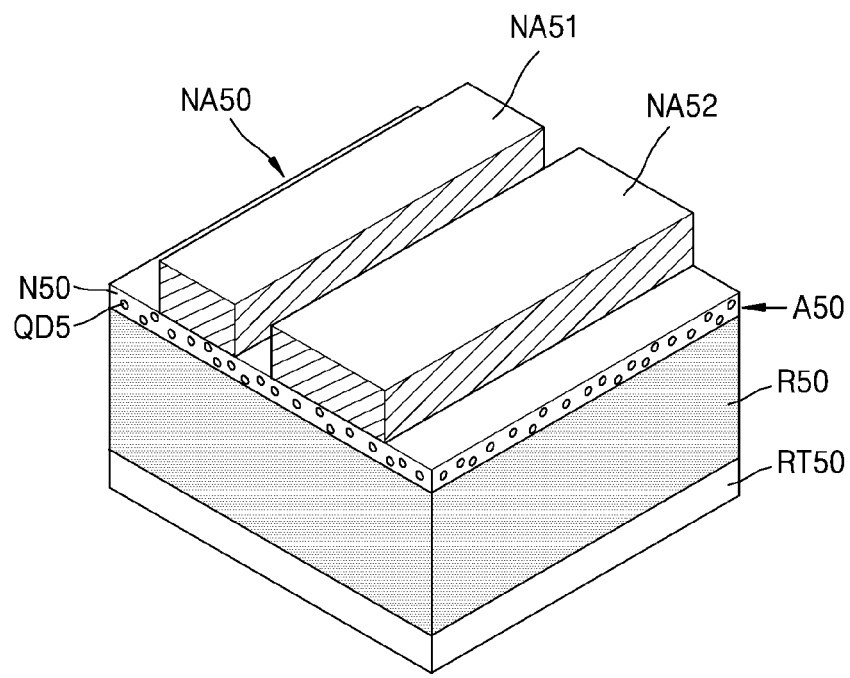
FIG. 7 is a perspective view of FIG. 6.

FIG. 6 is a cross-sectional view of a QD light modulator according to another example embodiment. FIG. 7 is a perspective view of FIG. 6.

Referring to FIGS. 6 and 7, the QD light modulator may include a QD-containing layer A50 containing quantum dots QD5 and a refractive index change layer R50 adjacent to the QD-containing layer A50. The QD-containing layer A50 may include the quantum dots QD5 embedded in an insulating layer N50. Furthermore, a reflector RT50 spaced apart from the QD-containing layer A50 may be further provided. The refractive index change layer R50 may be arranged between the reflector RT50 and the QD-containing layer A50. The light-emission characteristics of the QD-containing layer A50 may be controlled according to the change in the properties of the refractive index change layer R50. The refractive index change layer R50 may have a thickness related to the wavelength λ of light used to excite the quantum dots QD5. For example, the refractive index change layer R50 may have a thickness corresponding to an integer multiple of λ/4 with respect to the wavelength λ of the excitation light. In this case, phase of light may be adjusted in the refractive index change layer R50, and luminous efficiency may be thereby improved. However, a thickness condition of the refractive index change layer R50 is not limited to the above description. The reflector RT50 may be a metal layer or may include a metal layer. The reflector RT50 may be a back reflector electrode.

The refractive index change layer R50 may be a layer in which a refractive index is changed according to an electrical signal applied thereto or other condition change. A charge concentration (charge density) of an area in the refractive index change layer R50 may be changed according to an electric field applied to the refractive index change layer R50. Accordingly, the permittivity of the refractive index change layer R50 may be changed. The refractive index change layer R50 may include, for example, a transparent conductive oxide (TCO) such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO), or a transition metal nitride (TMN) such as TiN, ZrN, HfN, or TaN. In addition, the refractive index change layer R50 may include an electro-optic (EO) material whose effective permittivity is changed when an electrical signal is applied thereto. The EO material may include, for example, a crystal material such as $LiNbO_3$, $LiTaO_3$, potassium tantalate niobate (KTN), or lead zirconate titanate (PZT), or any of various polymers having EO characteristics. The refractive index change layer R50 may be a semiconductor, a conductor, or a dielectric. The refractive index change layer R50 may be transparent or substantially transparent.

The quantum dots QD5 may be ball-shaped, or shaped similar thereto, and may be semiconductor particles of a nanometer size, and may have a size (diameter) of about several nanometers (nm) to about several tens of nanometers. A QD may have a monolithic structure or a core-shell structure. The core-shell structure may be a single shell structure or a multi-shell structure. For instance, the core-shell structure may include a core part (central body) formed of a certain first semiconductor and a shell part formed of a second semiconductor. The QDs may include at least one of a II-VI group-based semiconductor, a III-V group-based semiconductor, a IV-VI group-based semiconductor, and a IV group-based semiconductor. Since the QDs have a very small size, a quantum confinement effect may be obtained. When particles are very small, electrons in a particle have a discontinuous energy state near an outer wall of the particle. In this case, as the size of a space in the particle decreases, the energy state of the electrons relatively increases and an energy band gap increases, which is referred to as the quantum confinement effect. According to the quantum confinement effect, when light, such as an infrared ray or a visible ray, is incident on QDs, light having a wavelength of various ranges may be generated. The wavelength of light output from a QD may be determined based on the size, material, or structure of the QD. More specifically, when light of a wavelength having energy greater than the energy band gap is incident on a QD, the QD may absorb energy of the light and be excited, and may return to the ground state by emitting light of a specific wavelength. In this case, as the size of the QD (or the core part of the QD) decreases, the wavelength of the light generated decreases. For example, a blue-based light or a green-based light, may be generated. As the size of the QD (or the core part of the QD) increases, the wavelength of the light generated increases. For example, a red-based light, may be generated. Accordingly, light of any of various colors may be generated depending on the size of a QD (or the core part of the QD). The emission wavelength may be controlled by controlling not only by the size (diameter) of a QD, but also the constituent material and structure thereof. The insulating layer N50, in which the quantum dots QD5 are embedded, may be dielectric layers, for example, a silicon oxide or a silicon nitride. The QD-containing layer A50 may have a thickness of, for example, about several tens of nanometers or less. The refractive index change layer R50 may have a thickness of, for example, about several tens of nanometers or less. However, the thicknesses of the QD-containing layer A50 and the refractive index change layer R50 are not limited thereto and may vary.

According to an example embodiment, by changing the characteristics of the refractive index change layer R50, the light-emission characteristics of the QD-containing layer A50 may be quickly and easily modulated. In particular, the characteristics of the refractive index change layer R50 may be easily changed by using an electrical signal, and consequently fast optical modulation may be possible.

The QD light modulator according to the present example embodiment may further include a nano-antenna structure NA50, having a dual patch structure, disposed on the QD-containing layer A50. The nano-antenna structure NA50 may include an input coupler NA51, corresponding to a first patch, an output coupler NA52, corresponding to a second patch. A resonance wavelength region of the input coupler NA51 may at least partially overlap with an excitation wavelength region of the quantum dots QD5. Light incident on the QD-containing layer A50 from the outside may be used as excitation light of the quantum dots QD5. The input coupler NA51 may improve input efficiency (input coupling efficiency) with respect to the excitation light (incident light) coming from the outside. In other words, the input coupler NA51 may function as an optical antenna with respect to the light for optically exciting the quantum dots QD5. A resonance wavelength region of the output coupler NA52 may at least partially overlap with an emission wavelength region of the quantum dots QD5. Accordingly, light output characteristics in the QD-containing layer A50 may be improved by the output coupler NA52. The width of the output coupler NA52 may be greater than the width of the input coupler NA51. A central resonance wavelength may vary according to the width of the coupler (NA51 or NA52). The QD-containing layer A50 may be arranged between the refractive index change layer R50 and the nano-antenna structure NA50. In this configuration, the nano-antenna structure NA50 may directly contact one surface of the QD-containing layer A50. At least a part of the nano-antenna structure NA50 may serve as a type of a partial reflective layer.

The reflector RT50 may serve as a mirror with respect to the light incident on the QD light modulator and the light emitted from the quantum dots QD5. Furthermore, the reflector RT50 may be used as an electrode for applying an electrical signal to the refractive index change layer R50.

Figure 8:
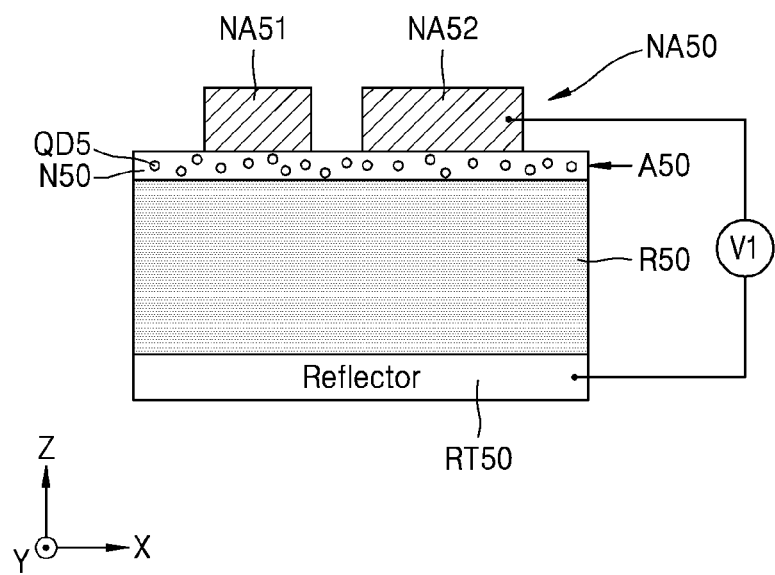
FIG. 8 is a cross-sectional view showing an example of a case in which a signal application device is connected to a QD light modulator, according to another example embodiment.

FIG. 8 is a cross-sectional view showing an example of a case in which a signal application device is connected to a QD light modulator, according to another example embodiment. This example embodiment shows a case in which a signal application device is connected to the QD light modulator of FIGS. 6 and 7.

Referring to FIG. 8, a signal application device for applying an electrical signal to the refractive index change layer R50 may be provided. For example, the signal application device may include a first voltage application device V1 for applying a voltage between the nano-antenna structure NA50 and the reflector RT50. The first voltage application device V1 may be connected between the output coupler NA52 and the reflector RT50. The properties of the refractive index change layer R50 may be changed by the voltage applied by the first voltage application device V1 between the output coupler NA52 and the reflector RT50, and consequently, the light-emission characteristics of the QD-containing layer A50 may be adjusted.

Figure 9:
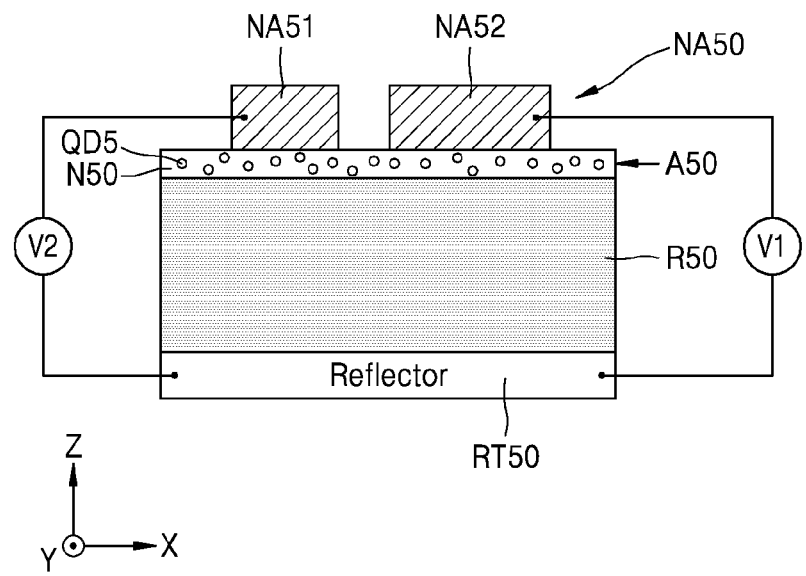
FIG. 9 is a cross-sectional view showing an example of a case in which a signal application device is connected to a QD light modulator, according to another example embodiment.

FIG. 9 is a cross-sectional view showing an example of a case in which a signal application device is connected to a QD light modulator, according to another example embodiment.

Referring to FIG. 9, the signal application device may include the first voltage application device V1 and a second voltage application device V2 for applying a voltage between the nano-antenna structure NA50 and the reflector RT50. The first voltage application device V1 may be connected between the output coupler NA52 and the reflector RT50, and the second voltage application device V2 may be connected between the input coupler NA51 and the reflector RT50. The second voltage application device V2 may adjust input coupling characteristics and input efficiency.

Although FIGS. 6 to 9 illustrate a case in which the nano-antenna structure has a multi-patch structure, according to another example embodiment, the nano-antenna structure may have a different structure such as a fishbone antenna structure, which is described below with reference to FIGS. 10 and 11.

Figure 10:
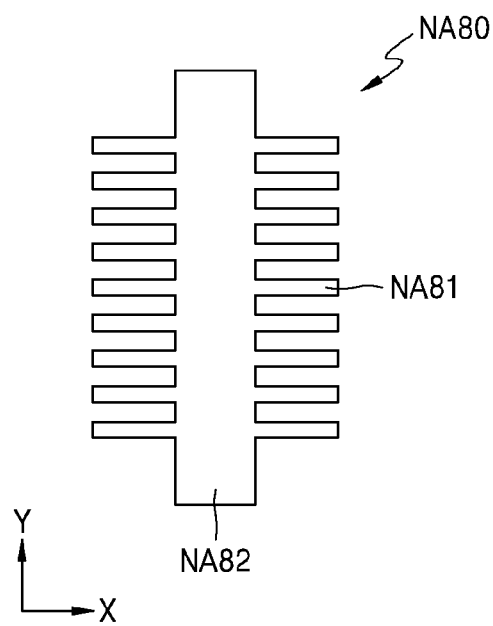
FIG. 10 illustrates a nano-antenna having a fishbone structure which is applicable to a QD light modulator according to an example embodiment.
Figure 11:
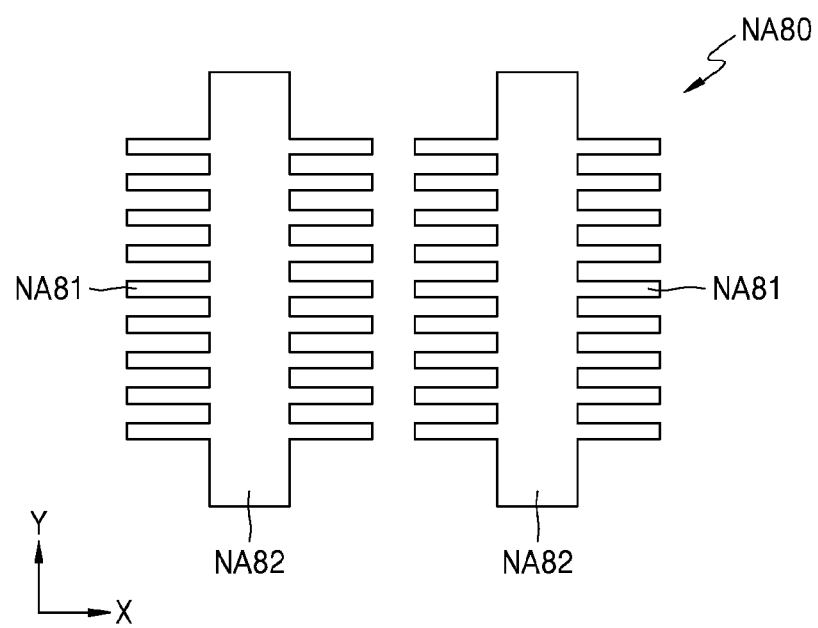
FIG. 11 illustrates a nano-antenna having a fishbone structure which is applicable to a QD light modulator according to another example embodiment.

FIGS. 10 and 11 are plan views for explaining example nano-antennas having a fishbone structure which is applicable to a QD light modulator according to an example embodiment FIG. 10 illustrates a nano-antenna having a fishbone structure which is applicable to a QD light modulator according to an example embodiment.

Referring to FIG. 10, a nano-antenna structure NA80 may include a first nano-antenna element NA81 extending in a first direction and a second nano-antenna element NA82 extending in a second direction perpendicular to the first direction. In the present example embodiment, the first nano-antenna element NA81 may include a plurality of first nano-antenna elements NA81 intersecting the second nano-antenna element NA82. Accordingly, the nano-antenna structure NA80 may have a fishbone structure.

The first nano-antenna element NA81 may be an input coupler, and the second nano-antenna element NA82 may be an output coupler. In this case, incident light may have a first polarized direction by the first nano-antenna element NA81, and output light may have a second polarized direction perpendicular to the first polarized direction by the second nano-antenna element NA82. Accordingly, when the nano-antenna NA80 having a fishbone structure is used, the polarized directions of the incident light and the output light may be controlled.

FIG. 11 illustrates a nano-antenna having a fishbone structure which is applicable to a QD light modulator according to another example embodiment;

Referring to FIG. 11, the nano-antenna structure NA80 may include a plurality of nano-antenna structures NA80 which are arranged according to a certain rule. In the present example embodiment, only two nano-antenna structures NA80 are illustrated. While the two nano-antenna structures NA80 may be substantially the same, in some cases, the size, pattern size, or pattern interval thereof may differ. Furthermore, although the nano-antenna structures NA80 are spaced apart from one another, the first nano-antenna elements NA81 of the nano-antenna structures NA80 may be connected to each other. The nano-antennas having a fishbone structure described with reference to FIGS. 10 and 11 are exemplary and may be variously changed.

Figure 12:
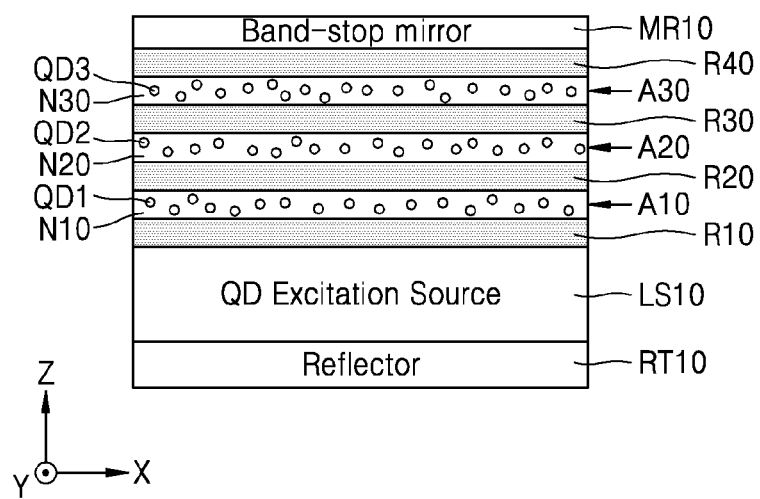
FIG. 12 is a cross-sectional view of a QD light modulator according to another example embodiment.

FIG. 12 is a cross-sectional view of a QD light modulator according to another example embodiment.

Referring to FIG. 12, a plurality of QD-containing layers A10, A20, and A30 containing QDs may be spaced apart from one another. For example, first to third QD-containing layers A10, A20, and A30 may be provided. However, the number of first to third QD-containing layers A10, A20, and A30 is exemplary and may be changed. The first to third QD-containing layers A10, A20, and A30 may respectively include first to third insulating layers N10, N20, and N30 and a plurality of quantum dots QD1, QD2, and QD3 respectively embedded in the first to third insulating layers N10, N20, and N30. The quantum dots QD1 included in the first QD-containing layer A10 may be referred to as first QDs, the quantum dots QD2 included in the second QD-containing layer A20 may be referred to as second QDs, and the quantum dots QD3 included in the third QD-containing layer A30 may be referred to as third QDs. At least two of the first to third QD-containing layers A10, A20, and A30 may have different central emission wavelengths. In this regard, at least two of the first to third quantum dots QD1, QD2, and QD3 may include different materials and/or have different sizes. The central emission wavelengths of the first to third QD-containing layers A10, A20, and A30 may vary according to the material or size of the QDs. All of the first to third quantum dots QD1, QD2, and QD3 may have different central emission wavelengths. However, in some cases, at least two of the first to third quantum dots QD1, QD2, and QD3 may have the same central emission wavelength. In this case, the at least two of the first to third quantum dots QD1, QD2, and QD3 may be substantially the same.

A plurality of refractive index change layers may be spaced apart from each other. For example, first to fourth refractive index change layers R10, R20, R30, and R40 may be provided, and the first to third QD-containing layers A10, A20, and A30 may be arranged between the first to fourth refractive index change layers R10, R20, R30, and R40, respectively. A refractive index of each of the first to fourth refractive index change layers R10, R20, R30, and R40 is variable according to an electrical signal applied thereto or other condition changes. A permittivity of the first to fourth refractive index change layers R10, R20, R30, and R40 is variable according to an electrical condition. A charge concentration (charge density) of an area(s) in the first to fourth refractive index change layers R10, R20, R30, and R40 may be changed according to an electric field applied to the first to fourth refractive index change layers R10, R20, R30, and R40. Accordingly, the permittivity of the first to fourth refractive index change layers R10, R20, R30, and R40 may be changed. For example, each of the first to fourth refractive index change layers R10, R20, R30, and R40 may include TCO such as ITO, IZO, AZO, GZO, AGZO, or GIZO, or a TMN such as TiN, ZrN, HfN, or TaN. In addition, the first to fourth refractive index change layers R10, R20, R30, and R40 may include an EO material whose effective permittivity is changed when an electrical signal is applied thereto. The EO material may include, for example, a crystal material such as $LiNbO_3$, $LiTaO_3$, KTN, or PZT, or various polymers having EO characteristics. The first to fourth refractive index change layers R10, R20, R30, and R40 may be a semiconductor, a conductor, or a dielectric. The first to fourth refractive index change layers R10, R20, R30, and R40 may be transparent or substantially transparent.

The first to fourth refractive index change layers R10, R20, R30, and R40 may be formed of the same material, and may have the same carrier density. By varying an electrical signal applied to the first to fourth refractive index change layers R10, R20, R30, and R40, or other conditions, the characteristics of the first to fourth refractive index change layers R10, R20, R30, and R40 may be independently controlled. In some example embodiments, at least two of the first to fourth refractive index change layers R10, R20, R30, and R40 may include different materials and/or may have different carrier densities. In this case, controlling the characteristics of the first to third QD-containing layers A10, A20, and A30 to be different from one another may be made easy by using the first to fourth refractive index change layers R10, R20, R30, and R40.

The QD light modulator according to the present example embodiment may be configured to modulate the light-emission characteristics of the first to third QD-containing layers A10, A20, and A30 by using a change in the refractive indexes of the first to fourth refractive index change layers R10, R20, R30, and R40. When the first to third QD-containing layers A10, A20, and A30 have different central emission wavelengths, the QD light modulator may have the characteristics of emitting light (light beams) of a multi-wavelength region. In this state, the light beams of a multi-wavelength region may be independently controlled. Accordingly, according to the present example embodiment, a QD light modulator capable of emitting light beams of a multi-wavelength region and easily controlling (modulating) the light beams may be provided. A QD light modulator capable of multiplexing the light beams of multiple wavelength regions (a plurality of wavelength regions) may be provided. A multiplexing QD light modulator capable of actively tuning a light beam for each wavelength region may be provided.

When the first to fourth refractive index change layers R10, R20, R30, and R40 and the first to third QD-containing layers A10, A20, and A30 constitute one "stack structure", the QD light modulator may further include a reflector RT10 provided at a side of one surface of the stack structure and a band-stop mirror MR10 provided at a side of the other surface of the stack structure. Furthermore, the QD light modulator may further include, between the stack structure and the reflector RT10, a light source element LS10 for optically exciting the first to third quantum dots QD1, QD2, and QD3 of the first to third QD-containing layers A10, A20, and A30.

The band-stop mirror MR10 may have reflection characteristics with respect to light of a specific wavelength region (band) and transmission characteristics with respect to other wavelength regions. The band-stop mirror MR10 may have, for example, a distributed Bragg reflector (DBR) structure. Two dielectric layers having different refractive indexes may be repeatedly stacked under a $\lambda/4$ thickness condition, where $\lambda$ is the wavelength of light, thereby increasing reflectivity or transmissivity of a desired wavelength region. However, the band-stop mirror MR10 may have a structure other than a DBR structure. The reflector RT10 may be formed of a conductor such as metal or, in some cases, may have a DBR structure. The reflector RT10 may be a back reflector electrode. The light source element LS10 may include an inorganic-based light-emitting device (iLED), an organic light-emitting device (OLED), or a laser diode (LD). Light to excite the first to third quantum dots QD1, QD2, and QD3, that is, excitation light, may be irradiated from the light source element LS10 toward the first to third QD-containing layers A10, A20, and A30. The reflector RT10 and the band-stop mirror MR10 may configure a cavity structure such that the above-described excitation light is internally reflected within the QD light modulator. Accordingly, the light source element LS10, the reflector RT10, and the band-stop mirror MR10 may increase luminous efficacy and modulation efficiency of the QD light modulator. The light emitted and modulated in the first to third QD-containing layers A10, A20, and A30 may be output (emitted) above the band-stop mirror MR10 by being transmitted through the same.

The QDs of to the present example embodiment, that is, the first to third quantum dots QD1, QD2, and QD3, may be ball-shaped semiconductor particles of a nanometer size or a shape similar thereto, and may have a size (diameter) of about several nanometers (nm) to about several tens of nanometers. A QD may have a monolithic structure or a core-shell structure. The QD may include at least one of a II-VI group-based semiconductor, a III-V group-based semiconductor, a IV-VI group-based semiconductor, and a IV group-based semiconductor. The wavelength of light generated from a QD may be determined based on the size, material, or structure of a particle (QD). The first to third insulating layers N10, N20, and N30, in which the quantum dots QD1, QD2, and QD3 are embedded, may be dielectric layers, for example, a silicon oxide or a silicon nitride. Each of the first to third QD-containing layers A10, A20, and A30 may have a thickness of, for example, about several tens of nanometers or less. Each of the first to fourth refractive index change layers R10, R20, R30, and R40 may have a thickness of, for example, about several tens of nanometers or less. However, the thicknesses of the first to third QD-containing layers A10, A20, and A30 and the first to fourth refractive index change layers R10, R20, R30, and R40 are not limited thereto and may vary.

According to an example embodiment, by using a change in the characteristics of the first to fourth refractive index change layers R10, R20, R30, and R40, the light-emission characteristics of the first to third QD-containing layers A10, A20, and A30 may be quickly and easily modulated. In particular, the characteristics of the first to fourth refractive index change layers R10, R20, R30, and R40 may be easily modulated by changing an electrical signal, and consequently fast optical modulation may be possible. Furthermore, by using the first to third QD-containing layers A10, A20, and A30 having different central emission wavelengths, light of multiple wavelength regions (that is, multicolor) may be multiplexed, and may be quickly modulated. Light beams of different wavelength regions may be independently controlled (modulated). When the first to third QD-containing layers A10, A20, and A30 all include the same quantum dots, luminous efficiency and modulation efficiency may be improved in a device formed by inserting the first to third QD-containing layers A10, A20, and A30 between the first to fourth refractive index change layers R10, R20, R30, and R40.

Figure 13:
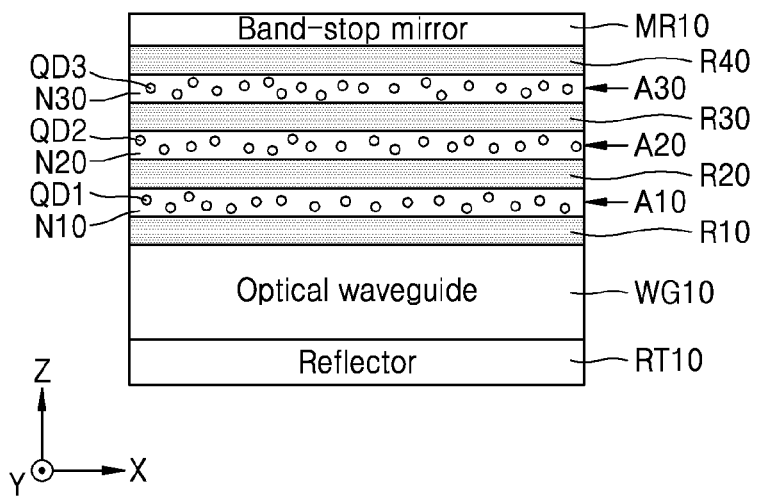
FIG. 13 is a cross-sectional view of a QD light modulator according to another example embodiment.

According to another example embodiment, in FIG. 12, an optical waveguide may be provided at a position of the light source element LS10, and an example thereof is illustrated in FIG. 13.

FIG. 13 illustrates that an optical waveguide WG10 is provided at a position of the light source element LS10 of FIG. 12. The optical waveguide WG10 guides light to optically excite the first to third quantum dots QD1, QD2, and QD3. In this case, a separate light source element (not shown) optically connected to the optical waveguide WG10 may be further provided.

According to another example embodiment, in FIGS. 12 and 13, the band-stop mirror MR10 may be omitted. Furthermore, among the first to fourth refractive index change layers R10, R20, R30, and R40, the uppermost refractive index change layer, that is, the fourth refractive index change layer R40, may be omitted. Furthermore, at least two of the first to third QD-containing layers A10, A20, and A30 may have different thicknesses. For example, the first insulating layer N10 of the first QD-containing layer A10, the second insulating layer N20 of the second QD-containing layer A20, and the third insulating layer N30 of the third QD-containing layer A30 may have different thicknesses. In this case, the amounts of the first to third quantum dots QD1, QD2, and QD3 respectively included in the first to third QD-containing layers A10, A20, and A30 may be different from one another. Furthermore, at least two of the first to fourth refractive index change layers R10, R20, R30, and R40 may have different thicknesses.

Figure 14:
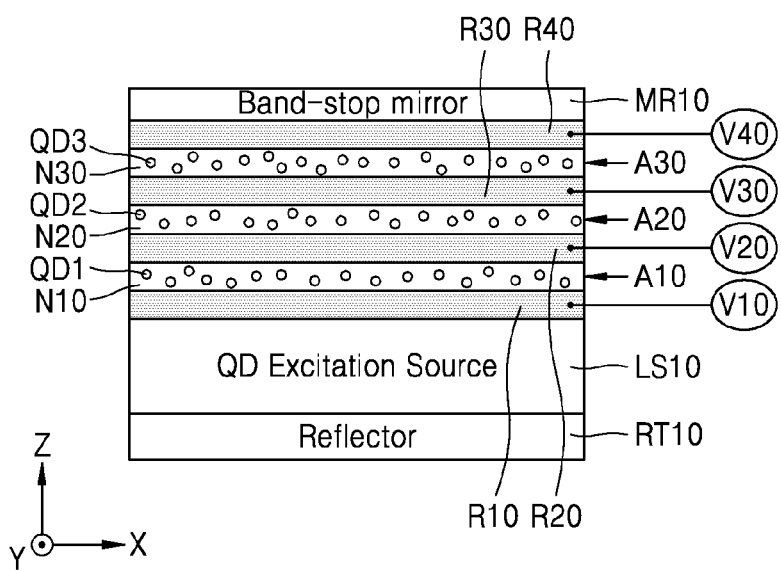
FIG. 14 is a cross-sectional view showing an example of a case in which a signal application device is connected to a QD light modulator, according to an example embodiment.

FIG. 14 is a cross-sectional view showing an example of a case in which a signal application device is connected to a QD light modulator, according to an example embodiment. The present example embodiment illustrates a case in which a signal application device is connected to the QD light modulator of FIG. 12.

Referring to FIG. 14, the signal application device for applying an electrical signal to each of the first to fourth refractive index change layers R10, R20, R30, and R40 may be connected to the QD light modulator. For example, the signal application device may include a first voltage application device V10 for applying a voltage to the first refractive index change layer R10, the second voltage application device V20 for applying a voltage to the second refractive index change layer R20, the third voltage application device V30 for applying a voltage to the third refractive index change layer R30, and the fourth voltage application device V40 for applying a voltage to the fourth refractive index change layer R40. An electrical signal (voltage) may be independently applied to each of the first to fourth refractive index change layers R10, R20, R30, and R40. The refractive indexes of the first to fourth refractive index change layers R10, R20, R30, and R40 may be changed by using the signal application device.

Figure 15:
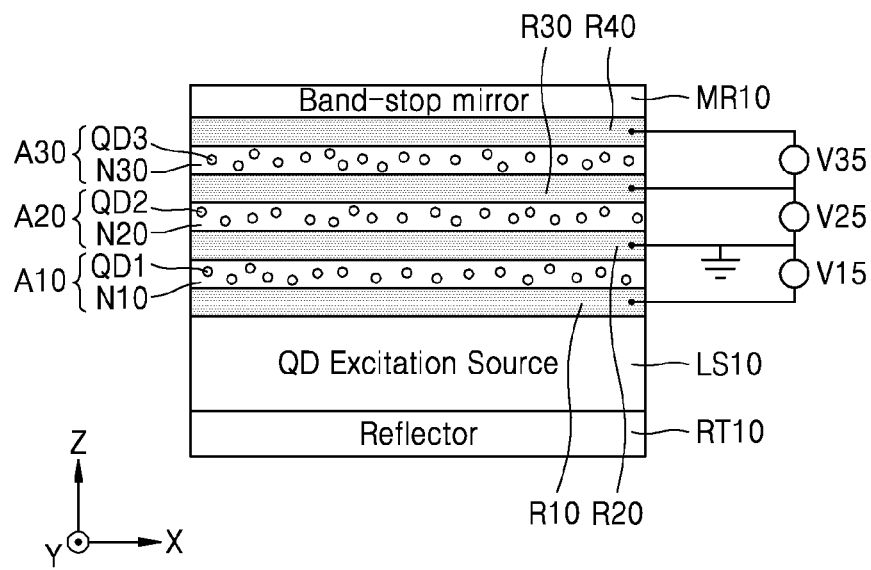
FIG. 15 is a cross-sectional view showing an example of a case in which a signal application device is connected to a QD light modulator, according to another example embodiment.

FIG. 15 is a cross-sectional view showing an example of a case in which a signal application device is connected to a QD light modulator, according to another example embodiment;

Referring to FIG. 15, the signal application device may include a first voltage application device V15 for applying a voltage between the first refractive index change layer R10 and the second refractive index change layer R20, a second voltage application device V25 for applying a voltage between the second refractive index change layer R20 and the third refractive index change layer R30, and a third voltage application device V35 for applying a voltage between the third refractive index change layer R30 and the fourth refractive index change layer R40. In this case, one of the first to fourth refractive index change layers R10, R20, R30, and R40 may be grounded. Although in the present example embodiment the second refractive index change layer R20 is illustrated to be grounded, this is exemplary and none of the first to fourth refractive index change layers R10, R20, R30, and R40 may be grounded as occasion arises.

Although FIGS. 14 and 15 illustrate the case in which the signal application device (signal application unit/element) for applying an electrical signal to the first to fourth refractive index change layers R10, R20, R30, and R40 is connected thereto, the connection method of the signal application device may be changed in any of various ways.

Figure 16:
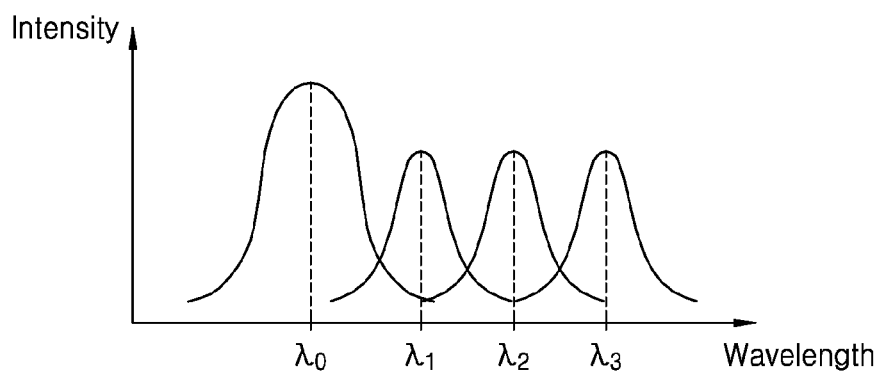
FIG. 16 is a graph showing an example of a central emission wavelength of a plurality of quantum dots and an emission wavelength of a light source element that is applicable to a QD light modulator according to an example embodiment.

FIG. 16 is a graph showing an example of a central emission wavelength of a plurality of quantum dots and an emission wavelength of a light source element that is applicable to a QD light modulator according to an example embodiment.

Referring to FIG. 16, the first QDs may have a first central emission wavelength $\lambda_1$, the second QDs may have a second central emission wavelength $\lambda_2$, and the third QDs may have a third central emission wavelength $\lambda_3$. The first to third central emission wavelengths $\lambda_1$, $\lambda_2$, and $\lambda_3$ may be different from each other. The first to third QDs may respectively correspond to, for example, the first to third quantum dots QD1, QD2, and QD3 of FIG. 1. An emission wavelength $\lambda_0$ of a light source element may be less than the first to third central emission wavelengths $\lambda_1$, $\lambda2$, and $\lambda3$. The light-emission energy of a light source element may be relatively high energy.

Figure 17:
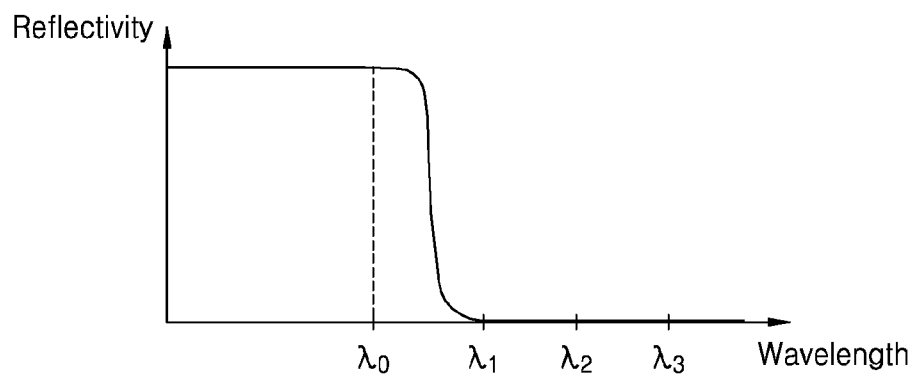
FIG. 17 is a graph showing an example of the reflection characteristics of a band-stop mirror that is applicable to a QD light modulator according to another example embodiment.

FIG. 17 is a graph showing an example of the reflection characteristics of a band-stop mirror that is applicable to a QD light modulator according to another example embodiment.

Referring to FIG. 17, the band-stop mirror may have high reflectivity to the emission wavelength $\lambda_0$ of a light source element and a wavelength less than or equal to the emission wavelength $\lambda_0$, and may have low reflectivity, that is, high transmissivity, to the emission wavelengths $\lambda_1$, $\lambda_2$, and $\lambda_3$ of the QDs. The band-stop mirror may correspond to, for example, the band-stop mirror MR10 of FIG. 12.

The QD light modulator according to an example embodiment may further include a non-antenna structure that is configured to control the output characteristics of light emitted from the QD-containing layers and provided on one surface of a stack structure including a plurality of QD-containing layers and a plurality of refractive index change layers. The nano-antenna structure may include an output coupler, and may further include an input coupler, as appropriate. The nano-antenna structure is described in detail with reference to FIGS. 18 to 24.

Figure 18:
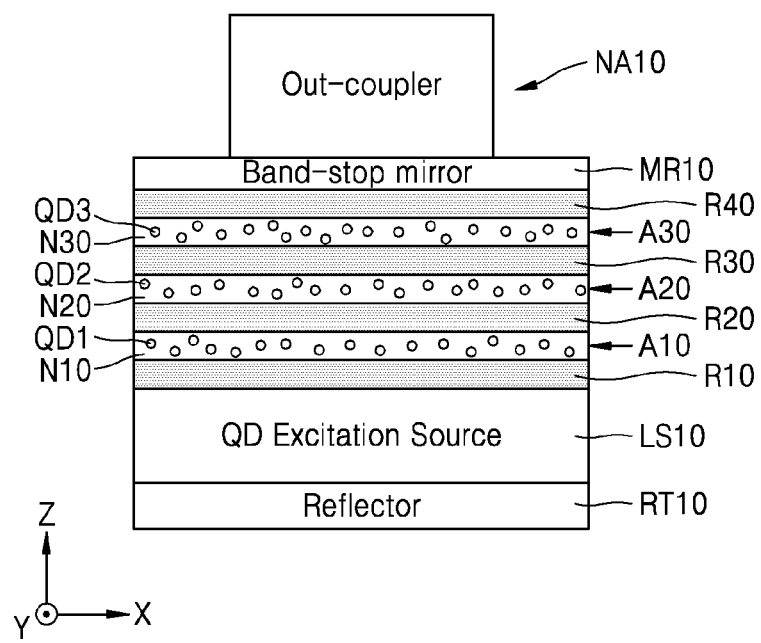
FIG. 18 is a cross-sectional view of a QD light modulator according to another example embodiment.

FIG. 18 is a cross-sectional view of a QD light modulator according to another example embodiment. The present example embodiment shows a case in which the nano-antenna structure NA10 is applied to the device of FIG. 12.

Referring to FIG. 18, a stack structure of the first to fourth refractive index change layers R10, R20, R30, and R40 and the first to third QD-containing layers A10, A20, and A30 may be provided on the light source element LS10. The band-stop mirror MR10 may be provided on the stack structure, and the nano-antenna structure NA10 may be provided on the band-stop mirror MR10. The nano-antenna structure NA10 may be an output coupler that improves the characteristics of light output from the first to third QD-containing layers A10, A20, and A30. The nano-antenna structure NA10 may have a configuration coupled to an emission wavelength of at least one of the first to third QD-containing layers A10, A20, and A30. For example, a resonance wavelength region of the nano-antenna structure NA10 may at least partially overlapped with an emission wavelength region of the first to third QD-containing layers A10, A20, and A30. The light-emission/output characteristics of the first to third QD-containing layers A10, A20, and A30 may be improved by the nano-antenna structure NA10, and the directivity and directionality of output light may be improved. Accordingly, far-field emission characteristics may be obtained by using the nano-antenna structure NA10.

The nano-antenna structure NA10 may include any one of various structures such as a metallic antenna, a dielectric antenna, or a slit-containing structure, for example, a structure in which a slit is formed in a metal layer. The output characteristics of light may vary according to the size, shape, or material of the nano-antenna structure NA10. Furthermore, the nano-antenna structure NA10 may include a refractive index change material or a phase change material. In this case, the output characteristics of light may be controlled by using the nano-antenna structure NA10, that is, a refractive index change or phase change of the output coupler. The nano-antenna structure NA10 may be applied to any of the variety of the QD light modulators described above.

Figure 19:
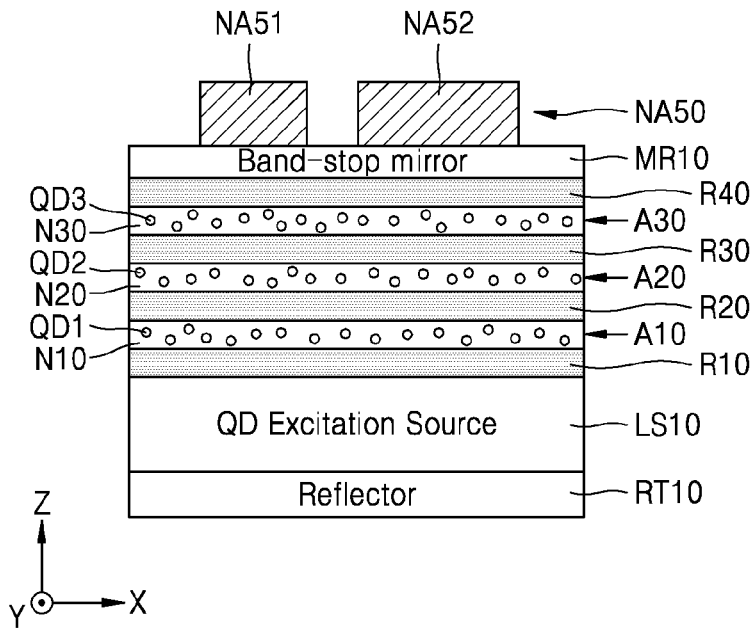
FIG. 19 is a cross-sectional view of a QD light modulator according to another example embodiment.

FIG. 19 is a cross-sectional view of a QD light modulator according to another example embodiment.

Referring to FIG. 19, the nano-antenna structure NA50 having a dual patch structure may be provided on the stack structure of the first to fourth refractive index change layers R10, R20, R30, and R40 and the first to third QD-containing layers A10, A20, and A30. The nano-antenna structure NA50 may include the input coupler NA51 corresponding to a first patch and the output coupler NA52 corresponding to a second patch. A resonance wavelength region of the input coupler NA51 may at least partially overlap with excitation wavelength regions of the quantum dots QD1, QD2, and QD3. When the light source element LS10 is used, excitation light generated from the light source element LS10 may be used, and excitation light coming from the outside may also be used. The input coupler NA51 may improve input efficiency (input coupling efficiency) with respect to the excitation light (incident light) coming from the outside. The resonance wavelength region of the output coupler NA52 may at least partially overlap with the emission wavelength regions of the quantum dots QD1, QD2, and QD3. Accordingly, the light output characteristics (output coupling characteristics) of the first to third QD-containing layers A10, A20, and A30 may be improved by the output coupler NA52. The width of the output coupler NA52 may be greater than the width of the input coupler NA51. A central resonance wavelength may depend on the width of the coupler (NA51 or NA52). The nano-antenna structure NA50 may be applied to any of the variety of the QD light modulators described above.

Although FIG. 19 illustrates a case in which the nano-antenna has a dual patch structure, a nano-antenna having a multi-patch structure having three or more patches may be used. An example thereof is illustrated in FIG. 20.

Figure 20:
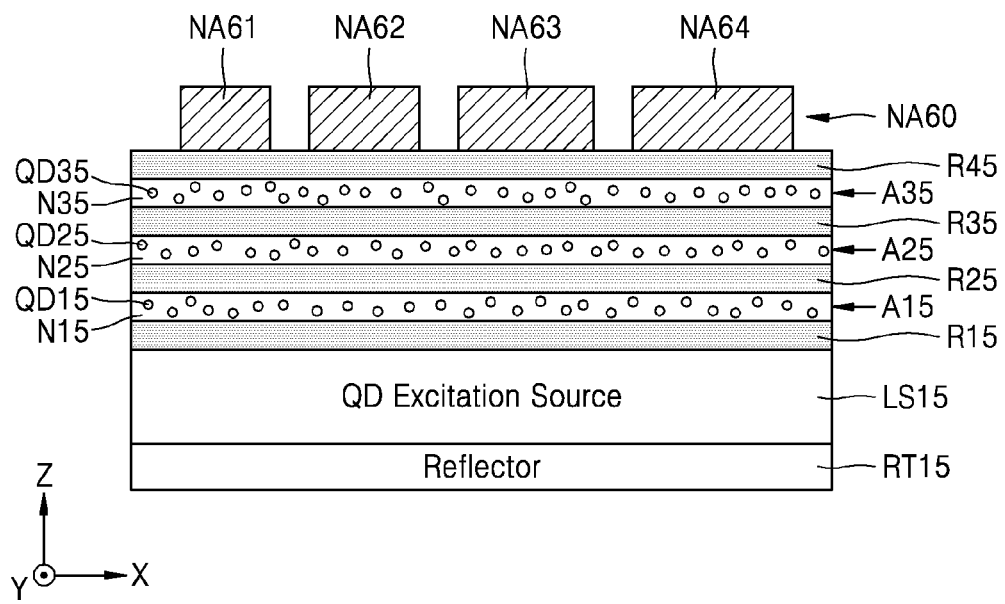
FIG. 20 is a cross-sectional view of a QD light modulator according to another example embodiment.

FIG. 20 is a cross-sectional view of a QD light modulator according to another example embodiment;

Referring to FIG. 20, a nano-antenna structure NA60 having a multi-patch structure may be provided on a stack structure of a plurality of refractive index change layers R15, R25, R35, and R45 and a plurality of QD-containing layers A15, A25, and A35. For example, the nano-antenna structure NA60 may include at least one input coupler NA61 and a plurality of output couplers, that is, first to third output couplers NA62, NA63, and NA64. The first to third output couplers NA62, NA63, and NA64 may be designed to be optically coupled to different emission wavelength regions. In this regard, the first to third output couplers NA62, NA63, and NA64 may have different sizes, include different materials, and/or have different shapes. The first output coupler NA62 may correspond to an emission wavelength region of first quantum dots QD15, the second output coupler NA63 may correspond to an emission wavelength region of second quantum dots QD25, and the third output coupler NA64 may correspond to an emission wavelength region of third quantum dots QD35. Accordingly, the nano-antenna structure NA60 may be designed such that light beams emitted from the QD-containing layers A15, A25, and A35 are output through different ones of the first to third output couplers NA62, NA63, and NA64. The shape, size, or arrangement order of the input coupler NA61 and the first, second, and third output couplers NA62, NA63, and NA64 illustrated in FIG. 20 are merely exemplary and may be changed, as necessary. In FIG. 20, RT15 and LS15 denote a reflector and a light source element, respectively, and N15, N25, and N35 denote insulating layers.

Figure 21:
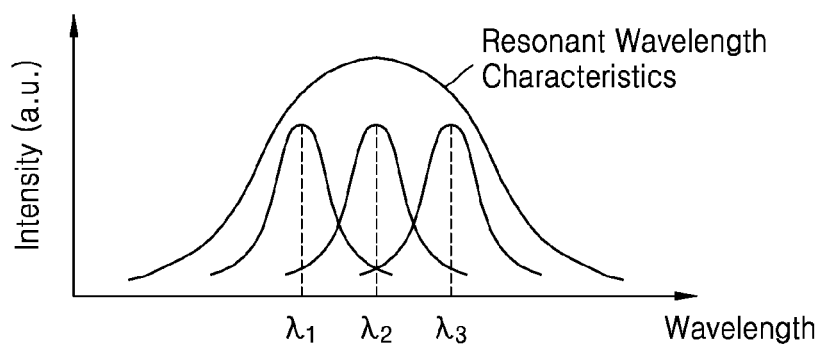
FIG. 21 is a graph showing a relationship between the central emission wavelength of a plurality of quantum dots and a resonance wavelength region of an output coupler which is applicable to a QD light modulator according to an example embodiment.

FIG. 21 is a graph showing a relationship between the central emission wavelength of a plurality of quantum dots and a resonance wavelength region of an output coupler which is applicable to a QD light modulator according to an example embodiment.

Referring to FIG. 21, the resonance wavelength region of an output coupler may cover regions of the central emission wavelengths $\lambda_1$, $\lambda_2$, and $\lambda_3$ of a plurality of QDs. Accordingly, the light-emission coupling characteristics of a plurality of QDs may be improved by the output coupler.

Figure 22:
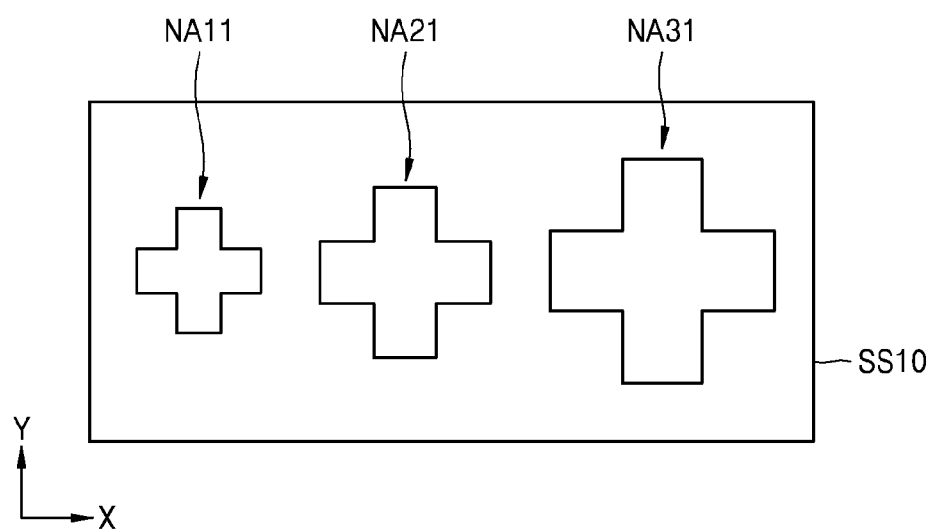
FIG. 22 is a plan view for explaining a nano-antenna structure which is applicable to a QD light modulator according to another example embodiment.

FIG. 22 is a plan view for explaining a nano-antenna structure which is applicable to a QD light modulator according to another example embodiment.

Referring to FIG. 22, a stack structure SS10 of a plurality of refractive index change layers and a plurality of QD-containing layers may include a plurality of nano-antennas. The nano-antennas may include, for example, a first nano-antenna NA11, a second nano-antenna NA21, and a third nano-antenna NA31. At least two of the first, second, and third nano-antennas NA11, NA21, and NA31 may have different sizes, may include different materials, and/or may have different shapes. In the present example embodiment, the first, second, and third nano-antennas NA11, NA21, and NA31 are illustrated as having different sizes. The first nano-antenna NA11 may have a first resonance wavelength region corresponding to the emission wavelength of the first quantum dots QD1, the second nano-antenna NA21 may have a second resonance wavelength region corresponding to the emission wavelength of the second quantum dots QD2, and the third nano-antenna NA31 may have a third resonance wavelength region corresponding to the emission wavelength of the third quantum dots QD3. In this case, light of different wavelengths may be output from the first, second, and third nano-antennas NA11, NA21, and NA31, respectively.

Figure 23:
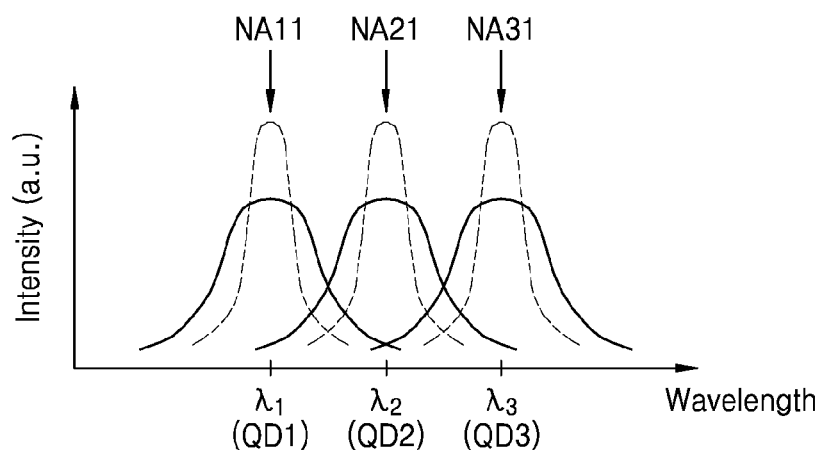
FIG. 23 is a graph showing a relationship between the central emission wavelength of a plurality of quantum dots and the resonance wavelength region of a plurality of output couplers (nano-antennas), which is applicable to a QD light modulator according to another example embodiment.

FIG. 23 is a graph showing a relationship between the central emission wavelength of a plurality of quantum dots and the resonance wavelength region of a plurality of output couplers (nano-antennas) which are applicable to a QD light modulator according to another example embodiment.

Referring to FIG. 23, a resonance wavelength region of the first output coupler NA11 may correspond to the central emission wavelength $\lambda_1$ of the first quantum dots QD1, a resonance wavelength region of the second output coupler NA21 may correspond to the central emission wavelength $\lambda_2$ of the second quantum dots QD2, and a resonance wavelength region of the third output coupler NA31 may correspond to the central emission wavelength $\lambda_3$ of the third quantum dots QD3. Accordingly, the light-emission coupling characteristics of each of the QDs may be improved by each output coupler.

Figure 24:
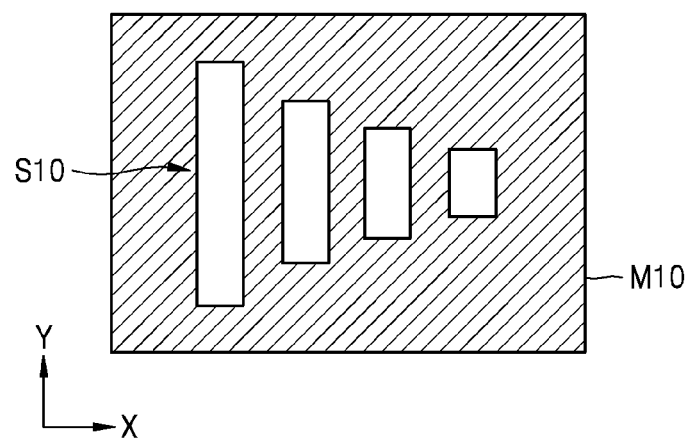
FIG. 24 is a plan view for explaining a nano-antenna structure which is applicable to a QD light modulator according to another example embodiment.

FIG. 24 is a plan view for explaining a nano-antenna structure which is applicable to a QD light modulator according to another example embodiment. In the present example embodiment, a nano-antenna structure includes a slit.

Referring to FIG. 24, one or more slits may be formed in a material layer M10. For example, a plurality of slits S10 may be arranged forming an array. The characteristics and direction of output light may be controlled according to the size and arrangement manner of the slits S10. However, the arrangement manner of the slit S10 proposed herein is merely exemplary and may be changed in any of various ways. The material layer M10 may be a metal layer.

Figure 25:
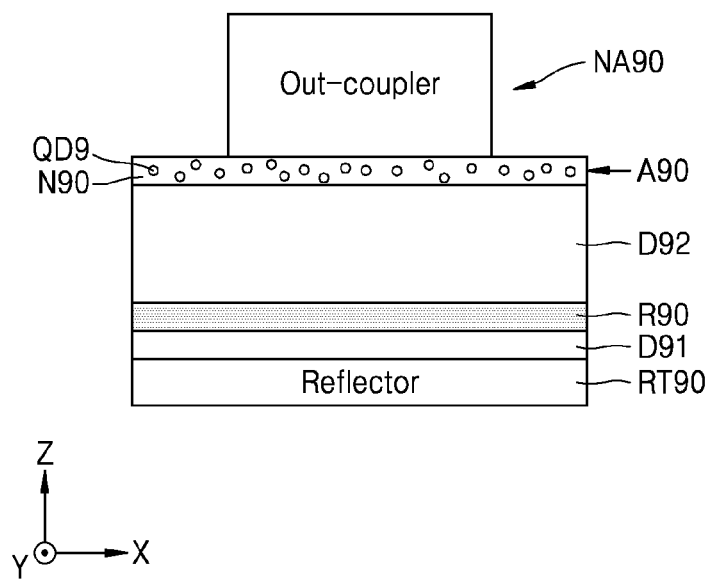
FIG. 25 is a cross-sectional view of a QD light modulator according to another example embodiment.

FIG. 25 is a cross-sectional view of a QD light modulator according to another example embodiment.

Referring to FIG. 25, a QD-containing layer A90 including QDs having light-emission characteristics may be provided. The QD-containing layer A90 may include an insulating layer N90 and a plurality of quantum dots QD9 embedded in the insulating layer N90. A nano-antenna structure NA90 having an outer coupler may be provided on the QD-containing layer A90.

The QD light modulator according to the present example embodiment may further include a refractive index change layer R90 and a reflector RT90. The refractive index change layer R90 may be arranged between the QD-containing layer A90 and the reflector RT90. Furthermore, a first dielectric layer D91 may be further provided between the reflector RT90 and the refractive index change layer R90, and a second dielectric layer D92 may be further provided between the refractive index change layer R90 and the QD-containing layer A90.

Both of the first and second dielectric layers D91 and D92 may be transparent with respect to light of a certain wavelength of interest (wavelength in use) region. The first and second dielectric layers D91 and D92 may make an optical distance as long as an integer multiple of $\lambda/4$ between the reflector RT90 in a lower side and the QD-containing layer A90 in an upper side. In this state, "$\lambda$" may be a central wavelength of the certain wavelength of interest (wavelength in use) region. By using these dielectric layers (D91 and D92), an effect that incident light is strongly focused on the QD-containing layer A90 may be obtained. In this regard, the QD light modulator according to the present example embodiment may have a Salisbury screen-type structure.

When the optical properties of the refractive index change layer R90 arranged between the first and second dielectric layers D91 and D92 are changed, the $\lambda/4$ integer multiple condition is broken, and thus the strength of light focused on the QD-containing layer A90 may be controlled. In other words, when the optical properties of the refractive index change layer R90 are changed, the optical distance between the reflector RT90 and the QD-containing layer A90 is changed, and thus the light-emission characteristics of the QD-containing layer A90 may be adjusted (modulated). The optical properties of the refractive index change layer R90 may be changed in any of various ways. For example, by applying a certain voltage between the reflector RT90 and the nano-antenna structure NA90, thereby applying an electric field to the refractive index change layer R90, the properties of the refractive index change layer R90 may be changed. Any of various other methods may alternately be used therefor. Although illustrated to be simple, the nano-antenna structure NA90 may be variously modified as described above.

The nano-antenna may be an antenna having a nano structure with respect to light, which may convert light (incident light including all visible and invisible electromagnetic waves) of a specific wavelength (or frequency) to a shape of a localized surface plasmon resonance, and capture energy thereof. The nano-antenna may a conductive layer pattern, for example, a metal layer pattern, and the conductive layer pattern may be in contact with a non-conductive layer, for example, a dielectric layer. Plasmon resonance may be generated at an interface between the conductive layer pattern and the non-conductive layer, for example, a dielectric layer. An interface where surface plasmon resonance is generated, such as, the interface between the conductive layer pattern and the non-conductive layer, for example, a dielectric layer, may be collectively referred to as a "meta surface" or a "meta structure". The nano-antenna may be formed of a conductive material and may have a dimension of a sub-wavelength. A sub-wavelength dimension is a dimension less than the operating wavelength of the nano-antenna. At least any one of the dimensions forming the shape of the nano-antenna, for example, a thickness, a horizontal length, a vertical length, or an interval between nano-antennas, may be a sub-wavelength dimension of.

The nano-antenna may have any of a variety of structures/shapes such as a rectangular pattern, a line pattern, a circular disc, an oval disc, a cross, or an asterisk. A cross type nano-antenna may have a shape in which two nanorods intersect perpendicular to each other. An asterisk type nano-antenna may have a star shape in which three nanorods intersect with one another. In addition, the nano-antenna may have any of a variety of modified structures such as a cone, a triangular pyramid, a sphere, a hemisphere, a rice grain, or a rod. Furthermore, the nano-antenna may have a multilayer structure in which a plurality of layers are stacked, or a core-shell structure including a core part and at least one shell part. Additionally, two or more nano-antennas having different structures/shapes forming one unit may be periodically arranged.

A resonance wavelength, a resonant wavelength width, resonant polarization characteristics, a resonance angle, and reflection/absorption/transmission characteristics may be varied depending on the structure/shape and arrangement method of the nano-antenna. Accordingly, by controlling the structure/shape and arrangement method of the nano-antenna, a QD light modulator having characteristics suitable for a particular purpose may be manufactured.

The QD light modulators according to various example embodiments may be applied to any of a variety of optical apparatuses such as a thin display, an ultrathin display, an on-chip emitter for an integrated optical circuit, a light fidelity (Li-Fi) field corresponding to a next generation wireless fidelity (Wi-Fi), or a light detection and ranging (LiDAR) apparatus. Furthermore, a QD light modulator according to one or more of the above-described example embodiments may be applied to a holographic display apparatus and a structured light generation apparatus. Furthermore, a QD light modulator according to one or more of the example embodiments may be applied to any of a variety of optical elements/apparatuses such as a hologram generation apparatus or an optical coupling device. Furthermore, a QD light modulator according to one or more of the example embodiments may be applied to any of a variety of fields in which a "meta surface" or a "meta structure" is used. In addition, a QD light modulator according to one or more of the above-described example embodiments and an optical apparatus including the same may be applied to any of a variety of optical and electronic apparatus fields for any of various purposes.

Additionally, although in the above-described example embodiments application (biasing) of an electrical signal, that is, a voltage, is mainly described for modulating a refractive index of the refractive index change layer, there may be a variety of methods of modulating the refractive index of the refractive index change layer. For example, a modulating method of the refractive index of the refractive index change layer may include electric field application, magnetic field application, heating and cooling, optical pumping, or microscale or nanoscale electro-mechanical deformation and modulation. Furthermore, a material and a configuration/structure of the refractive index change layer may be changed in any of various ways.

It should be understood that example embodiments described herein should be considered in a descriptive sense only and not for purposes of limitation. Descriptions of features or aspects within each example embodiment should typically be considered as available for other similar features or aspects in other example embodiments. For example, one of ordinary skill in the art to which the present disclosure pertains would understand that the structure of the QD light modulator described with reference to FIGS. 1 to 25 may be changed in any of various ways. While one or more example embodiments have been described with reference to the figures, it will be understood by those of ordinary skill in the art that various changes in form and details may be made therein without departing from the spirit and scope as defined by the following claims.

What is claimed is:

1. A quantum dot (QD) light modulator comprising:
a QD-containing layer comprising a plurality of QDs having light-emission characteristics;
a refractive index change layer arranged adjacent to the QD-containing layer; and
a reflector arranged facing the QD-containing layer,
wherein the QD light modulator is configured to modulate the light-emission characteristics of the QD-containing layer according to a change in properties of the refractive index change layer,
wherein the QD-containing layer is disposed between the refractive index change layer and the reflector, and
wherein the QD light modulator comprises a signal application device that applies an electrical signal between the refractive index change layer and the reflector so that the electrical signal flows through the QD-containing layer disposed between the refractive index change layer and the reflector.

2. The QD light modulator of claim 1, wherein the refractive index change layer comprises a carrier density change area within which a carrier density changes, and wherein the carrier density change area is disposed on a boundary surface between the refractive index change layer and the QD-containing layer.

3. The QD light modulator of claim 1, wherein the refractive index change layer comprises at least one of a transparent conductive oxide and a transition metal nitride.

4. The QD light modulator of claim 1, wherein the plurality of QDs are configured to be excitable by a wavelength $\lambda$ of light, and wherein the refractive index change layer has a thickness corresponding to an integer multiple of $\lambda/4$.

5. The QD light modulator of claim 1, wherein the signal application device applies the electrical signal to the refractive index change layer,
wherein a refractive index of the refractive index change layer is changeable according to the electrical signal applied by the signal application device.

6. The QD light modulator of claim 1, wherein the QD-containing layer comprises the plurality of QDs embedded in an insulating layer.

7. The QD light modulator of claim 1, wherein the reflector comprises a metal layer.

8. The QD light modulator of claim 1, further comprising a nano-antenna structure that is arranged on the QD-containing layer,
wherein the QD-containing layer and the refractive index change layer are arranged between the reflector and the nano-antenna structure.

9. The QD light modulator of claim 8, wherein the nano-antenna structure comprises an output coupler that is configured to control output characteristics of light emitted from the QD-containing layer.

10. The QD light modulator of claim 9, wherein a resonance wavelength region of the output coupler at least partially overlaps with an emission wavelength region of the QD-containing layer.

11. The QD light modulator of claim 9, wherein the nano-antenna structure further comprises an input coupler that is spaced apart from the output coupler, and
wherein a width of the output coupler is greater than a width of the input coupler.

12. The QD light modulator of claim 11, wherein a resonance wavelength region of the input coupler at least partially overlaps with an excitation wavelength region of the plurality of QDs.

13. The QD light modulator of claim 8, wherein the nano-antenna structure corresponds to a fishbone antenna structure comprising a plurality of first nano-antenna elements extending in a first direction, and a second nano-antenna element extending in a second direction perpendicular to the first direction, and
wherein the plurality of first nano-antenna elements intersect the second nano-antenna element.

14. The QD light modulator of claim 8, wherein the nano-antenna structure comprises one of a metallic antenna, a dielectric antenna, and a slit-containing structure.

15. The QD light modulator of claim 1, wherein:
the QD-containing layer and the refractive index change layer, together, constitute a stack structure, and
the QD light modulator further comprises a band-stop mirror arranged on the stack structure.

16. The QD light modulator of claim 15, further comprising, arranged between the stack structure and the reflector, at least one of a light source element that optically excites the plurality of QDs of the QD-containing layer, and an optical waveguide that guides light to optically excite the plurality of QDs of the QD-containing layer.

17. An optical apparatus comprising the quantum dot (QD) light modulator of claim 1.

18. A quantum dot (QD) light modulator comprising:
a QD-containing layer comprising a plurality of QDs having light-emission characteristics;
a refractive index change layer arranged adjacent to the QD-containing layer; and
a reflector arranged facing the QD-containing layer,
wherein the QD light modulator is configured to modulate the light-emission characteristics of the QD-containing layer according to a change in properties of the refractive index change layer,
wherein the refractive index change layer comprises a plurality of refractive index change layers and the QD-containing layer comprises a plurality of QD-containing layers, and
the plurality of refractive index change layers and the plurality of QD-containing layers are stacked alternatingly.

19. The QD light modulator of claim 18, wherein the plurality of QD-containing layers comprises a first layer having a first central emission wavelength and a second layer having a second central emission wavelength, different from the first central emission wavelength.

20. The QD light modulator of claim 18, wherein the plurality of QD-containing layers comprise a first QD-containing layer and a second QD-containing layer, the first QD-containing layer comprising a first plurality of QDs and the second QD-containing layer comprising a second plurality of QDs, and
wherein a characteristic of the first plurality of QDs is different from the characteristic of the second plurality of QDs, wherein the characteristic is one of a materials and a size.

21. The QD light modulator of claim 18, wherein a characteristic of a first layer of the plurality of refractive index change layers is different from the characteristic of a second layer of the plurality of refractive index change layers, wherein the characteristic is one of a material and a carrier density.

22. A quantum dot (QD) light modulator comprising:
a QD-containing layer comprising a plurality of QDs having light-emission characteristics;
a refractive index change layer arranged adjacent to the QD-containing layer;
a reflector arranged facing the QD-containing layer;
a first dielectric layer arranged between the reflector and the refractive index change layer; and
a second dielectric layer arranged between the refractive index change layer and the QD-containing layer,
wherein the QD light modulator is configured to modulate the light-emission characteristics of the QD-containing layer according to a change in properties of the refractive index change layer.

* * * * *